(12) United States Patent
DePriest et al.

(10) Patent No.: US 7,397,828 B2
(45) Date of Patent: Jul. 8, 2008

(54) LASER SYSTEM WITH MULTIPLE WAVELENGTH DIODE PUMP HEAD AND ASSOCIATED METHOD

(75) Inventors: Christopher M. DePriest, Tavares, FL (US); Mark A. Decker, Orlando, FL (US); Matthew D. Hawk, Orlando, FL (US); Steven J. Lindauer, Orlando, FL (US); Laurance S. Lingvay, Longwood, FL (US); Gary D. Ross, Longwood, FL (US); Douglas P. Stanley, Longwood, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 331 days.

(21) Appl. No.: 11/169,212

(22) Filed: Jun. 28, 2005

(65) Prior Publication Data

US 2006/0291520 A1    Dec. 28, 2006

(51) Int. Cl.
*H01S 3/113*  (2006.01)
*H01S 3/22*   (2006.01)
*H01S 3/08*   (2006.01)

(52) U.S. Cl. .............................. 372/11; 372/55; 372/92
(58) Field of Classification Search ................ 372/11, 372/34, 36, 55, 69, 72, 75, 90, 92, 98, 99
See application file for complete search history.

(56) References Cited

U.S. PATENT DOCUMENTS 5,114,661 A * 5/1992 Prelas ......................... 376/146
5,838,712 A * 11/1998 Kraenert et al. ............... 372/75

OTHER PUBLICATIONS

McCarthy et al., Athermal, Lightweight, Diode-Pumped, 1 micron Transmitter; Solid State Lasers XIV: Technology and Devices, Proceedings of SPIE vol. 5707, pp. 237-242; SPIE, Bellingham, Washington.

* cited by examiner

*Primary Examiner*—Armando Rodriguez
(74) *Attorney, Agent, or Firm*—Alston & Bird LLP

(57) ABSTRACT

A laser system comprises a reflective chamber capable of housing a laser medium and at least two laser diodes emitting light at different respective wavelengths into the reflective chamber. The wavelength of each respective laser diode may be selected to minimize fluctuations in absorption by the laser medium of light emitted by the diode bars as the wavelength of each respective laser diode changes due to changes in an operating temperature of the laser system. The wavelength of each respective laser diode may be selected such that absorption by the laser medium of the wavelength of light emitted by one laser diode increases and absorption by the laser medium of the wavelength of light emitted by another laser diode decreases as the operating temperature changes within a predefined range.

21 Claims, 4 Drawing Sheets

LASER SYSTEM WITH MULTIPLE WAVELENGTH DIODE PUMP HEAD AND ASSOCIATED METHOD

FIELD OF THE INVENTION

The present invention relates generally to laser systems, and more particularly, to diode pump heads for laser systems.

BACKGROUND OF THE INVENTION

Laser systems are widely used in portable applications, including military applications. For example, laser rangefinders and target designators may be carried by soldiers to be used during combat operations. Because such portable laser systems are often used outdoors and in harsh environmental conditions, the laser systems typically are required to operate over broad temperature ranges (e.g., −40° C. to +70° C.). Because such portable laser systems are often carried by soldiers traveling on foot, the weight of such systems is desirably minimized.

Portable laser systems typically use flashlamps to pump the active laser media. The electrical-to-optical power conversion efficiency (termed wallplug efficiency) of flashlamp pumped laser systems is typically low, for example from 1 to 3%. Because of the low wallplug efficiency of flashlamp pumped portable laser systems, a large percentage of the weight of such a laser system (e.g., approximately 20% for target designators) may be devoted to the batteries used to power the system. Spare batteries are typically also carried by users of such flashlamp pumped portable laser systems. As a result, a soldier may carry over 40 pounds of batteries for use with a typical target designator.

Laser diode bars, typically arranged into diode arrays comprising several diode bars, have been developed and used to pump solid state lasers. Because of the ability to match the spectral output of a laser diode array to the peak absorption wavelength of the laser medium, the wallplug efficiency of diode pumped laser systems is typically much greater than the wallplug efficiency of flashlamp pumped laser systems. For example, a flashlamp pumped Nd:YAG (neodymium doped, yttrium aluminum garnet) laser capable of producing 100 millijoules of pulsed output energy may have a typical wallplug efficiency of 3%. A similar diode pumped Nd:YAG laser may have a typical wallplug efficiency of greater than 15%. The increased efficiency of diode pumping typically reduces the required prime power of a diode pumped laser.

A typical laser medium may have one main absorption peak, such that pump light at the frequency corresponding to the main absorption peak will be absorbed more readily by the laser medium than pump light at a different wavelength. The absorption spectrum of a typical Nd:YAG laser medium is illustrated in FIG. 1. A main absorption peak 10 corresponds to approximately 808 nm, such that a diode array emitting light with a wavelength of 808 nm would typically be used to pump a laser using such an Nd:YAG medium. (The wavelength of the output of a diode array is specified at a defined operating temperature, for example at 25 degrees Celsius (° C.), and varies to higher or lower wavelengths if the operating temperature differs from the defined operating temperature.) A laser medium may have more than one absorption peak other than the main absorption peak, such as absorption peak 12 of FIG. 1 (three of which are highlighted in FIG. 1). Pump light at a wavelength corresponding with such an absorption peak (other than the main absorption peak) may also be readily absorbed by the medium, although not as efficiently as light that corresponds to the main absorption peak 10. A typical diode pumped laser would therefore use a diode array with a wavelength corresponding to the main absorption peak of the laser medium to maximize absorption.

However, the wavelength of the light emitted from a diode array typically changes as its temperature changes. By way of example, this wavelength shift may be 0.3 nanometers per degree Celsius (nm/° C.) for one diode array. Since the output spectral width of a typical diode array is approximately 3 to 6 nanometers, temperature changes of the diode array of more than a few degrees C. from the optimum temperature (i.e., the temperature at which the wavelength of the output of the diode array matches the peak absorption wavelength of the laser medium) will cause the spectral output of the diode array to shift away from the peak absorption wavelength such that the absorption of the pump energy by the laser medium will greatly decrease, and therefore the efficiency of the laser system will also decrease greatly. Because of the efficiency decrease that may be caused by temperature changes, diode pumped lasers typically require careful thermal management to minimize temperature changes of the diode array. For example, a typical Nd:YAG laser may be pumped by diode arrays that emit light at a wavelength of 808 nm at a desired operating temperature. Such a laser may require that the temperature of the diode arrays be maintained within approximately plus or minus 5° C. to maintain the emitted wavelength at or close enough to the peak absorption wavelength of the laser medium to maintain laser efficiency within approximately 5 to 10% of peak efficiency, i.e., the peak absorption wavelength lies within the output spectral width of the diode array. As such, complex thermal management equipment, such as diode array coolers and heaters, are typically used to maintain the optimum temperature of the diode array in a diode pumped laser system. However, such thermal management equipment increases the size and weight of the laser system, which is particularly undesirable for portable laser systems. Such equipment also increases the complexity of the laser system, which may be undesirable in combat situations. The cost of adding such thermal management equipment increases the cost of diode pumped laser systems. Additionally, the electrical power needed to operate the heaters and coolers decreases the overall laser system efficiency and therefore requires more batteries, which in turn further increases the weight and/or decreases the lifetime of the system.

As such, there is a need for a portable laser system with increased efficiency to reduce the battery requirements while maintaining the ability to operate across a wide temperature range.

BRIEF SUMMARY OF THE INVENTION

A laser system is therefore provided that uses two or more laser diodes that emit light at different wavelengths into a reflective chamber housing the laser medium. The wavelengths of the light emitted by the laser diodes are selected such that, even with temperature fluctuations and the corresponding changes in the wavelengths of the light emitted by the laser diodes, the current wavelength of the light emitted by at least one laser diode falls on or close to a peak absorption wavelength of the laser medium such that the temperature fluctuations do not reduce total absorption by the laser medium. Since the laser system is permitted to operate over a broad range of temperatures, the thermal management equipment can be advantageously reduced in terms of weight, cost, and power consumption relative to conventional laser systems.

In this regard, a laser system comprises a reflective chamber capable of housing a laser medium having a peak absorption wavelength and at least two laser diodes emitting light at different respective wavelengths into the reflective chamber. The wavelength of light emitted by each respective laser diode may be selected such that the wavelength of light emitted by at least one laser diode is displaced from the peak absorption wavelength at all temperatures within the predefined range of operating temperatures. As such, fluctuations in absorption by the laser medium of light emitted by the diode bars may be minimized as the wavelength of light emitted by each respective diode bar changes due to changes in an operating temperature of the laser system.

Although various numbers of laser diodes may be employed, one embodiment of the laser system includes at least six laser diodes, each emitting light at a different respective wavelength. The diode bars may be mounted on a heat sink, although more elaborate thermal management systems may be avoided.

In one exemplary embodiment, the wavelength of each respective diode bar is selected such that absorption by the laser medium of the wavelength of light emitted by one laser diode increases and absorption by the laser medium of the wavelength of light emitted by another laser diode decreases as the operating temperature varies within the predefined range of operating temperatures. Thus, even though the output wavelength of one or more laser diodes is permitted to move away from a peak absorption wavelength due to changes in the operating temperature, the output of other laser diodes that emit light at different wavelengths moves toward a peak absorption wavelength such that the laser medium continues to be efficiently pumped even as the operating temperature varies over a wider temperature range.

In one exemplary embodiment, the reflective chamber has a hemi-cylindrical shape. The laser medium may be located on a flat inner surface of the reflective chamber. The diode bars may emit light into the reflective chamber through at least one elongated opening in the reflective chamber. The elongated opening may have a long axis that is aligned with a long axis of the reflective chamber. An inner surface of the reflective chamber may be coated with a reflective material, including but not limited to ceramic, gold, silver, aluminum, chromium, nickel chromium, barium sulfate, and thermoplastic resin such as that sold under the tradename Spectralon, to facilitate the repeated reflection of the pump signals which correspondingly increases the percentage of the pump signals absorbed by the laser medium. (Spectralon is a registered trademark of Labsphere, Inc.)

The duration of a current pulse applied to the diode bars may be varied based on the operating temperature of the laser system to further control the absorption of light emitted by the laser diodes. The dopant level of the laser medium may also be selected to minimize fluctuations in absorption by the laser medium of light emitted by the diode bars as the wavelength of each respective diode bar changes. The laser medium may have various geometries, including zig-zag slab, straight-through slab, rod, fiber, and disk.

In addition to the improved laser system as described above, other aspects of the present invention are directed to corresponding methods for operating an improved laser system.

Embodiments of the invention provide an improved diode pumped laser system having increased wallplug efficiency as compared to flashlamp pumped laser systems and having the ability to operate across a wide temperature range without using heaters and/or coolers to maintain a constant diode bar temperature. As a result, the number of batteries needed to operate the laser is reduced, thereby decreasing the overall carry weight and/or increasing the lifetime of portable devices using such an improved laser system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
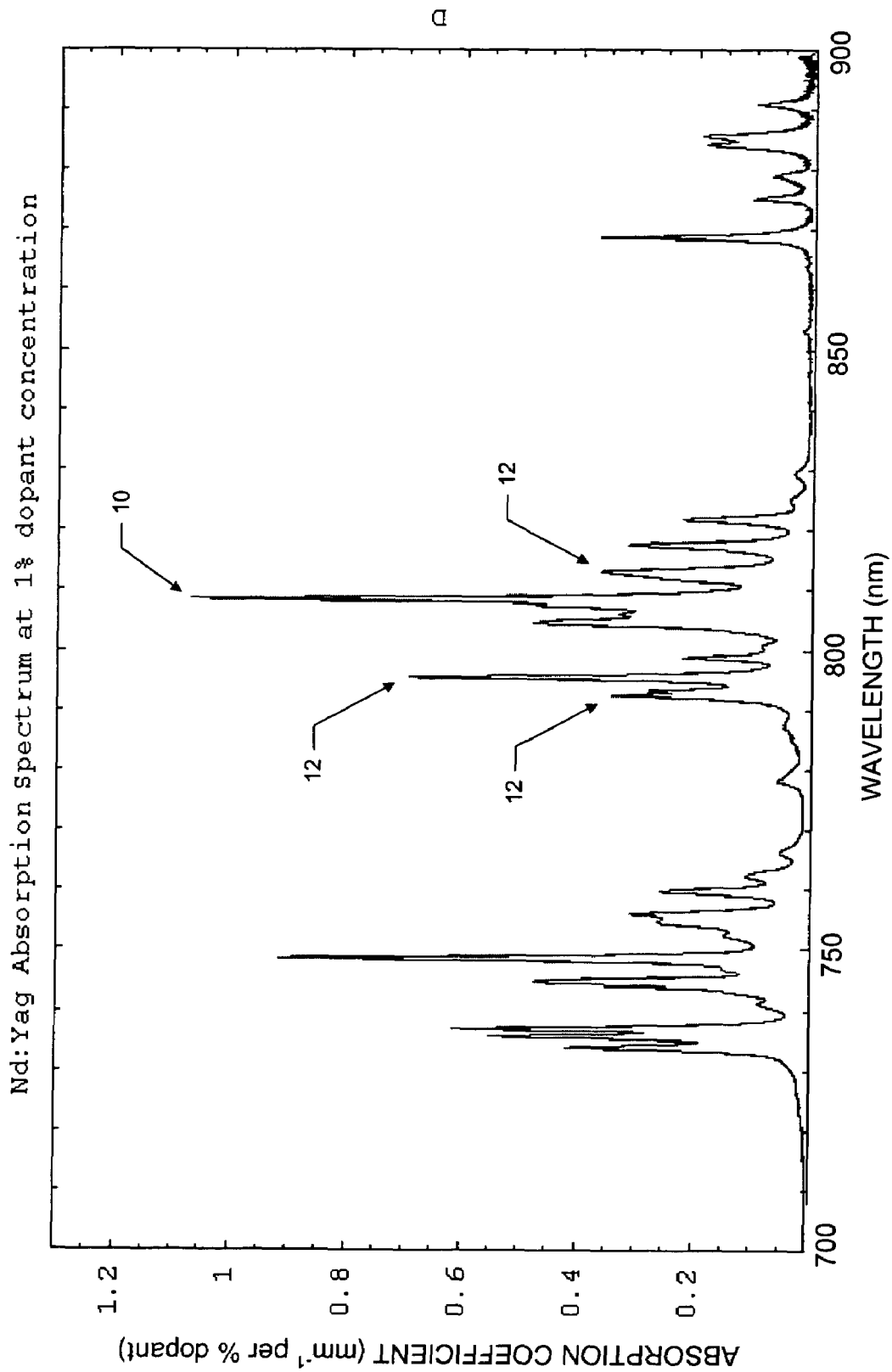
FIG. 1 illustrates the absorption spectrum of typical Nd:YAG laser medium.

Embodiments of the present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While embodiments of the invention may be described in terms of a portable laser system, systems and methods of embodiments of the present invention can be used in any laser system in which improved energy efficiency and a wider operating temperature range are desirable.

Embodiments of the invention provide an improved diode pumped laser system having two or more laser diodes, typically configured as two or more diode bars, emitting light at different wavelengths. The diode bars emit light into a reflective chamber housing the laser medium. As the operating temperature of the laser system varies, due to changing environmental conditions and/or heat produced internal to the laser system during its operation, the temperature of the diode bars is allowed to change. The changing temperature of the diode bars in turn causes the wavelength of the light emitted by each diode bar to change. The different wavelengths of light emitted by the diode bars are selected such that, as light emitted by the wavelengths of the diode bars shift, the wavelengths of light emitted by one or more of the diode bars will shift toward one or more of the laser medium absorption peaks as the wavelengths of light emitted by one or more other diode bars are shifting away from one or more of the absorption peaks. As the wavelengths of light emitted by some diode bars are shifting away from absorption peaks, the light absorbed from those diode bars by the laser medium will decrease. Correspondingly, as the wavelengths of light emitted by some diode bars are shifting toward absorption peaks, the light absorbed from those diode bars by the laser medium will increase. Proper selection of the output wavelengths of the diode bars can ensure that the decreased absorption of the light from the diode bars shifting away from absorption peaks is offset by the increased absorption of the light from the diode bars shifting toward absorption peaks, thereby minimizing the fluctuations of the total absorption by the laser medium. The wavelengths of light emitted by the diode bars will typically be selected to minimize fluctuations over the desired operating temperature range of the laser system, which may be, for example, −40° C. to +70° C.

To further increase absorption, especially of light having a wavelength that does not correspond to an absorption peak, and to thereby further minimize the fluctuations of the total absorption, the laser medium is typically located in a reflective chamber. The diode bars may emit light into the reflective chamber directed toward the laser medium. Light that is not absorbed by the laser medium on the light's initial pass through the medium will typically reflect off the inner surface of the chamber such that the light may pass again through the medium. More of the light will typically be absorbed on the second pass through the medium. Light that is not absorbed on the second pass will typically again reflect off the chamber surface and again pass through the medium, thereby enabling more light to be absorbed. Unabsorbed light will continue to be reflected inside the chamber until all of the light is either absorbed or lost. In one embodiment, the light may be reflected approximately twenty to thirty times until all of the light is either absorbed or lost. Leakage paths through which light may be lost from the chamber will typically be minimized. The multiple passes of the light through the laser medium, enabled by the reflective chamber, increases the overall absorption of the light and thereby further reduces fluctuations of the total absorption by the laser medium.

Even with proper selection of the diode bar wavelengths and the use of the reflective chamber, the total absorption of light by the laser medium may be decreased at the upper and lower ends of the operating temperature range since the output of at least some of the laser diodes will fall outside of the absorption spectrum of the laser medium and therefore not be absorbed in any meaningful way. To increase absorption of light at the upper and lower ends of the temperature range, such that the fluctuations of the total absorption by the laser medium are minimized across the entire operating temperature range, the duration of the current pulse applied to the diode bars may be varied based on the operating temperature of the laser system. This variation of the current pulse duration will typically involve applying the current pulse for a longer duration when the operating temperature of the laser system is at the upper or lower end of the operating range. For example, the current pulsewidth may increase linearly, in a stairstep manner, or otherwise as the temperature approaches its upper or lower end, such as by being above a predefined maximum temperature or below a predefined minimum temperature. As will be apparent to those skilled in the art, the laser system therefore also includes a power source, such as the aforementioned batteries, and a control or drive circuit for controlling the current delivered to the laser diode from the power source. Additionally, the laser system can include a temperature sensor for providing feedback indicative of the operating temperature of the laser diode to the control circuit such that the pulsewidth of the drive current can be controllably adjusted.

Figure 2:
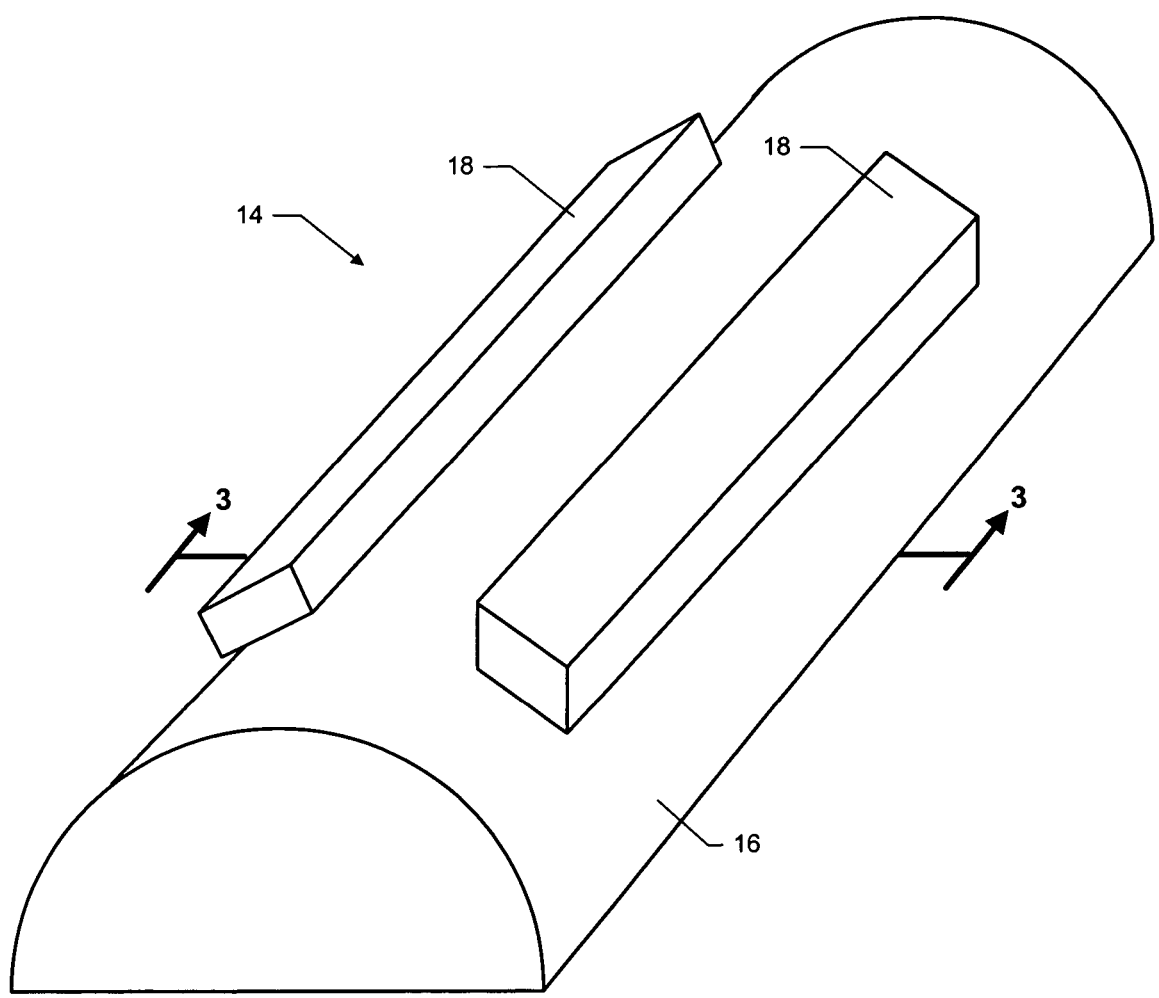
FIG. 2 is a perspective view of diode arrays and a reflective chamber of a laser system, in accordance with an exemplary embodiment of the invention.

Referring now to FIG. 2, a perspective view of laser diodes in the form of diode bar arrays and a reflective chamber of a laser system is illustrated in accordance with an exemplary embodiment of the invention. Laser system 14 comprises diode bar arrays which emit light into reflective chamber 16. The diode bar arrays of FIG. 2 are arranged into two banks 18 of bar arrays, described in more detail below. The number of diode banks, as well as the number and configuration of diode bar arrays in the diode banks and the number and configuration of diode bars in the diode bar arrays, may vary depending on a number of factors such as the desired output of the laser system, the type of laser medium, the desired operating temperature range of the laser system, and the like. Also, the laser diodes may be formed of various materials depending upon the desired output characteristics, but are formed of (In)GaAlAs (Indium-Galium-Aluminum-Arsenide) in one embodiment. Reflective chamber 16 contains the laser medium (not shown in FIG. 2). Reflective chamber 16 has a hemi-cylindrical shape, although other shapes may be used. The curvature and volume of the reflective chamber may also vary as desired.

Figure 3:
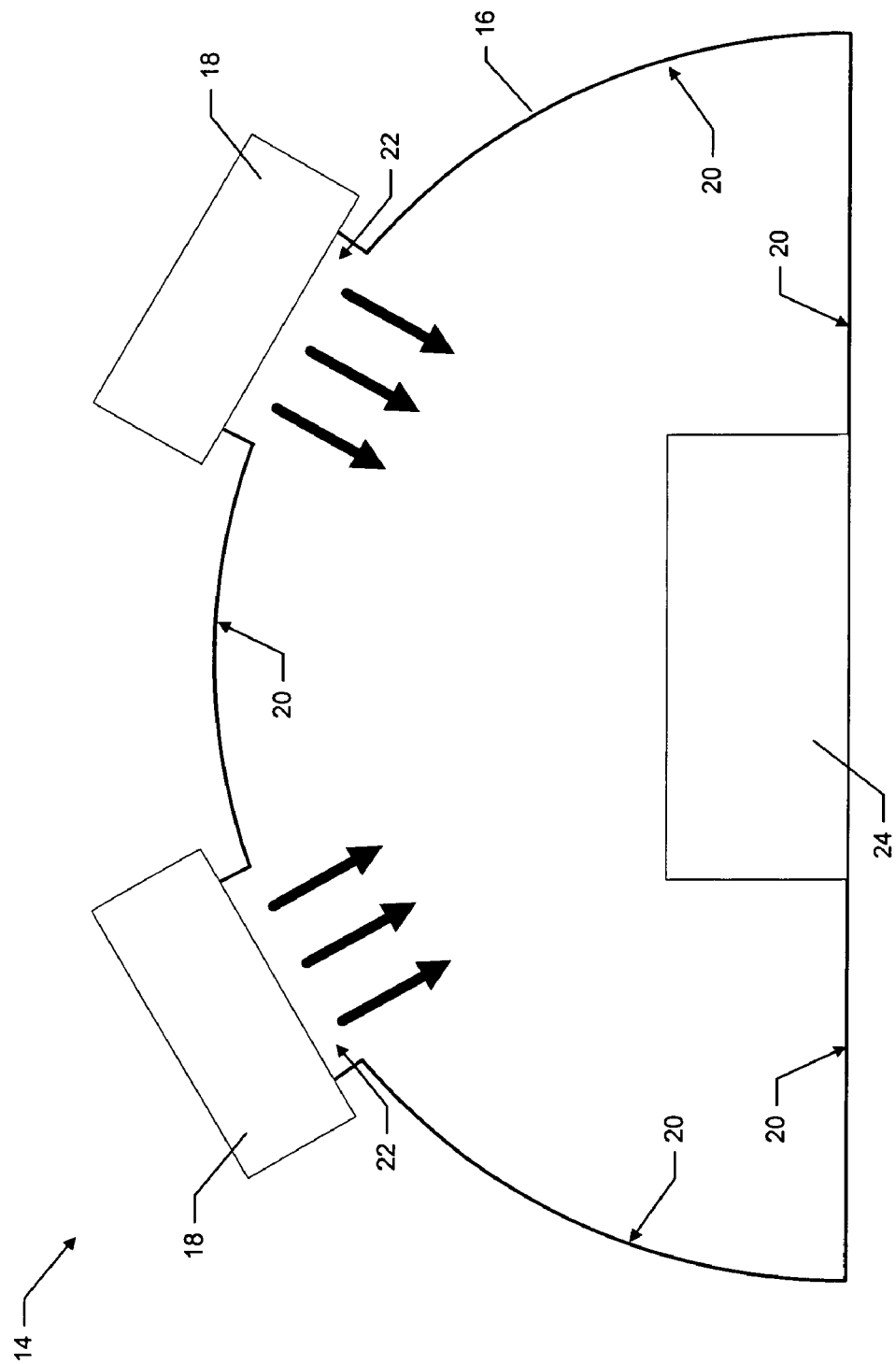
FIG. 3 is a sectional view of the laser system of FIG. 2.

Referring now to FIG. 3, a sectional view of the laser system 14 of FIG. 2 is illustrated. The banks 18 of diode bar arrays emit light (indicated by the arrows) into reflective chamber 16 through openings 22. The openings 22 may be elongated openings having long axes that are aligned with a long axis of the reflective chamber, although other configurations may be used depending on the configuration of the diode bar arrays and the laser medium. The inner surface 20 of the reflective chamber is typically a high reflectance surface able to confine the diode light within the chamber, allowing the light to reflect numerous times within the chamber such that the unabsorbed light may strike the laser medium numerous times until most of the light is absorbed. The inner surface 20 may be diffusely reflective or specularly reflective. For example, the inner surface 20 may comprise a diffuse ceramic material. Other diffuse reflectors may also be used, including but not limted to diffuse metallic surfaces (e.g., gold, silver, aluminum, chromium, nickel chromium), diffuse packed power reflectors, diffuse painted powder reflectors, diffuse thermoplastic resins (e.g., Spectralon), and the like.

The reflective chamber 16 houses the laser medium 24. Typically, the chamber is filled with an inert gas, such as nitrogen, although the chamber may be filled with other gases if so desired. The laser medium may be Nd:YAG. Alternatively, other neodymium-doped materials, such as YLF (yttrium-lithium-fluoride), YALO (yttrium-aluminum oxide), or glass, may be used. Other rare-earth-dopants, such as holmium, thulium, and erbium crystals or glass, may be used. The laser medium may be fully doped or partially doped. In addition to the many different laser medium materials that may be used, many different laser medium configurations, such as zig-zag slab, straight-through slab, rod, disk, and the like, may be used. Depending on the particular materials and dimensions of the laser medium, the dopant level may be selected to minimize fluctuations in absorption of light by the laser medium over the operating temperature range. For example, larger slabs of laser medium may require lower dopant levels in order to encourage uniform deposition of the pump energy throughout the gain medium over the operating temperature range. This is due to the fact that absorption is an exponential function of length traveled in the gain medium, and most of the incident pump power is absorbed within one absorption skin depth—a length which changes only with the dopant level design parameter.

The banks of diode bar arrays of laser system 14 will typically be mounted on a heat sink to help remove excess heat generated by the electrical inefficiency of the diode bar arrays. The laser medium may also have a passive heat sink (i.e., the piece of metal to which the laser medium is contact-bonded at the flat surface of the hemicylinder), which in turn may be connected to the pump diode heat sink via a conductive metal heat-flow path. Both the laser diodes and the laser gain medium may be heat-sunk to a passive system of fins which convectively cool the pump head. While other, more elaborate, thermal management systems may be employed, the laser system of some embodiments of the present invention is advantageous in that the weight, cost, and power requirements of more elaborate and active thermal management systems may be avoided.

Figure 4:
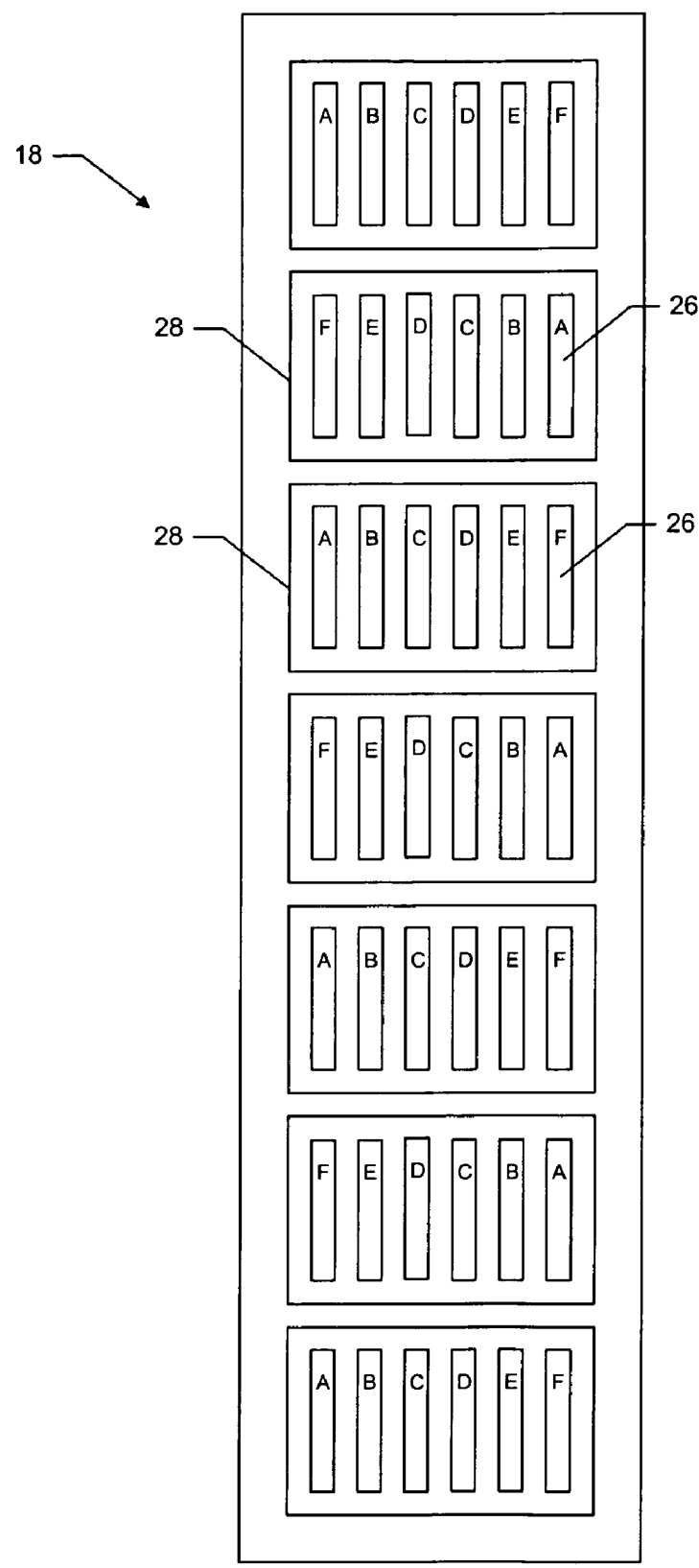
FIG. 4 is an orthogonal view of a bank of diode bars of a laser system, in accordance with an exemplary embodiment of the invention.

Referring now to FIG. 4, an orthogonal view of a bank of diode bar arrays of a laser system is illustrated, in accordance with an exemplary embodiment of the invention. The bank 18 of diode bar arrays comprises seven two dimensional (2-D) diode bar arrays 28. Each 2-D diode array 28 comprises six diode bars 26 (also termed one dimensional (1-D) diode arrays). Each diode bar may comprise approximately forty-six light emitters, although the number of emitters per diode bar may vary. Each diode bar 26 within a 2-D array 28 typically emits light at a different wavelength, indicated by labels A-F. As discussed above, the wavelength of each diode bar 26 is selected to minimize fluctuations in the total absorption by the laser medium over the desired operating temperature range of the laser system. For example, for an exemplary Nd:YAG laser system having a main absorption peak of 808.6 nm and several other smaller absorption peaks (as illustrated by the absorption spectrum of FIG. 1), and having a desired operating temperature range of −40° C. to +70° C., the selected wavelengths of light emitted by the diode bars generally differ by a nontrivial amount, such as 1 or more nm, and, in one embodiment, may be 799 nm, 801 nm, 804 nm, 807 nm, 808 nm, and 813 nm. By selecting laser diode bars that emit light at these different wavelengths, as the operating temperature varies and thus the output wavelength of each laser diode bar varies, absorption by the laser medium of light emitted by one or more of the diode bars may increase as the absorption by the laser medium of light emitted by one or more other diode bars decreases. As such, the increased absorption may offset the decreased absorption and fluctuations in the total absorption may be minimized. As noted above, in an exemplary embodiment, each diode bar array may comprise one diode bar emitting light at each different wavelength, although different configurations are also appropriate. The diode bars may be arranged in a stacked, or parallel, configuration. When more than one diode bar array is used, the diode bars may be stacked in a different order in each array to ensure adequate dispersion of each wavelength throughout the reflective chamber. For example, one diode bar array may stack the diode bars in order from highest wavelength to lowest wavelength, while a second diode bar array may stack the bars in order from lowest wavelength to highest wavelength. This alternating stacking order is illustrated in FIG. 4. However, the number of diode bars, the number of diode bar arrays, and the number of banks of arrays may vary, as well as the configuration of the diode bars, arrays, and banks.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A laser system having a predefined range of operating temperatures, the laser system comprising:
   a reflective chamber capable of housing a laser medium, the laser medium having a peak absorption wavelength;
   at least two laser diodes emitting light at different respective wavelengths into the reflective chamber; and
   a power source and a control circuit for applying a current pulse to the laser diodes, the current pulse having a duration that varies based on the operating temperature of the laser system;
   wherein the wavelength of light emitted by each respective laser diode is selected such that the wavelength of light emitted by at least one laser diode is displaced from the peak absorption wavelength at all temperatures within the predefined range of operating temperatures.

2. The laser system of claim 1, wherein the wavelength of light emitted by each respective laser diode is selected such that absorption by the laser medium of the wavelength of light emitted by one laser diode increases and absorption by the laser medium of the wavelength of light emitted by another laser diode decreases as the operating temperature varies within the predefined range of operating temperatures.

3. The laser system of claim 1, wherein the at least two laser diodes comprise six laser diodes, each emitting light at a different respective wavelength.

4. The laser system of claim 1, wherein the reflective chamber has a hemi-cylindrical shape.

5. The laser system of claim 4, wherein the laser medium is located on a flat inner surface of the reflective chamber and the laser diodes emit light into the reflective chamber through at least one elongated opening in the reflective chamber, the elongated opening having a long axis that is aligned with a long axis of the reflective chamber.

6. The laser system of claim 1, further comprising a heat sink for mounting the laser diodes.

7. The laser system of claim 1, wherein an inner surface of the reflective chamber is coated with a reflective material selected from the group comprising ceramic, gold, silver, aluminum, chromium, nickel chromium, barium sulfate and thermoplastic resin.

8. The laser system of claim 1, where the laser medium has a geometry selected from the group comprising zig-zag slab, straight-through slab, rod, fiber, and disk.

9. A laser system having a predefined range of operating temperatures, the laser system comprising:
   a reflective chamber capable of housing a laser medium; and
   at least two laser diodes emitting light at different respective wavelengths into the reflective chamber;
   wherein the wavelength of light emitted by each respective laser diode is selected such that absorption by the laser medium of the wavelength of light emitted by one laser diode increases and absorption by the laser medium of the wavelength of light emitted by another laser diode decreases as the operating temperature varies within the predefined range of operating temperatures.

10. The laser system of claim 9, wherein the at least two laser diodes comprise six laser diodes, each emitting light at a different respective wavelength.

11. The laser system of claim 9, wherein the reflective chamber has a hemi-cylindrical shape.

12. The laser system of claim 11, wherein the laser medium is located on a flat inner surface of the reflective chamber and the laser diodes emit light into the reflective chamber through at least one elongated opening in the reflective chamber, the elongated opening having a long axis that is aligned with a long axis of the reflective chamber.

13. The laser system of claim 9, further comprising a heat sink for mounting the laser diodes.

14. The laser system of claim 9, wherein an inner surface of the reflective chamber is coated with a reflective material selected from the group comprising ceramic, gold, silver, aluminum, chromium, nickel chromium, barium sulfate, and thermoplastic resin.

15. The laser system of claim 9, further comprising a power source and a control circuit for applying a current pulse to the laser diodes, the current pulse having a duration that varies based on the operating temperature of the laser system.

16. The laser system of claim 9, where the laser medium has a geometry selected from the group comprising zig-zag slab, straight-through slab, rod, fiber, and disk.

17. A method for operating a laser system having a predefined range of operating temperatures, the method comprising:
   emitting light at different respective wavelengths from at least two laser diodes into a reflective chamber, the reflective chamber capable of housing a laser medium;
   wherein the wavelength of light emitted by each respective laser diode is selected such that absorption by the laser medium of the wavelength of light emitted by one laser diode increases and absorption by the laser medium of the wavelength of light emitted by another laser diode decreases as the operating temperature varies within the predefined range of operating temperatures.

18. The method of claim 17, further comprising:
   emitting light from the laser diodes into the reflective chamber through at least one elongated opening in the reflective chamber, the elongated opening having a long axis that is aligned with a long axis of the reflective chamber.

19. The method of claim 17, further comprising:
   varying a duration of a current pulse applied to the laser diodes based on the operating temperature of the laser system.

20. A laser system having a predefined range of operating temperatures, the laser system comprising:
   a reflective chamber capable of housing a laser medium, the laser medium having a peak absorption wavelength; and
   at least two laser diodes emitting light at different respective wavelengths into the reflective chamber;
   wherein the wavelength of light emitted by each respective laser diode is selected such that the wavelength of light emitted by at least one laser diode is displaced from the peak absorption wavelength at all temperatures within the predefined range of operating temperatures,
   wherein the reflective chamber has a hemi-cylindrical shape, and
   wherein the laser medium is located on a flat inner surface of the reflective chamber and the laser diodes emit light into the reflective chamber through at least one elongated opening in the reflective chamber, the elongated opening having a long axis that is aligned with a long axis of the reflective chamber.

21. A laser system having a predefined range of operating temperatures, the laser system comprising:
   a reflective chamber capable of housing a laser medium, the laser medium having a peak absorption wavelength; and
   at least two laser diodes emitting light at different respective wavelengths into the reflective chamber;
   wherein the wavelength of light emitted by each respective laser diode is selected such that the wavelength of light emitted by at least one laser diode is displaced from the peak absorption wavelength at all temperatures within the predefined range of operating temperatures, and
   wherein the wavelength of light emitted by each respective laser diode is selected such that absorption by the laser medium of the wavelength of light emitted by one laser diode increases and absorption by the laser medium of the wavelength of light emitted by another laser diode decreases as the operating temperature varies within the predefined range of operating temperatures.

* * * * *